United States Patent
Hung

(10) Patent No.: US 10,533,776 B2
(45) Date of Patent: Jan. 14, 2020

(54) HEAT STORAGE DEVICE

(71) Applicant: Tseng-Tung Hung, Kaohsiung (TW)

(72) Inventor: Tseng-Tung Hung, Kaohsiung (TW)

( * ) Notice: Subject to any disclaimer, the term of this patent is extended or adjusted under 35 U.S.C. 154(b) by 305 days.

(21) Appl. No.: 15/361,965

(22) Filed: Nov. 28, 2016

(65) Prior Publication Data

US 2017/0074548 A1   Mar. 16, 2017

Related U.S. Application Data

(63) Continuation-in-part of application No. 13/107,152, filed on May 13, 2011, now abandoned.

(51) Int. Cl.
*F24S 60/00* (2018.01)
*F28D 20/00* (2006.01)

(52) U.S. Cl.
CPC .............. *F24S 60/00* (2018.05); *F28D 20/00* (2013.01); *F28D 20/0056* (2013.01); *Y02E 70/30* (2013.01)

(58) Field of Classification Search
CPC ............................. F24S 60/00; F28D 20/0056
See application file for complete search history.

(56) References Cited

U.S. PATENT DOCUMENTS

| | | | | |
|---|---|---|---|---|
| 2,680,565 A | * | 6/1954 | Lof | F24F 5/0046 126/591 |
| 3,039,941 A | * | 6/1962 | Sweeney | B01D 3/4216 165/110 |
| 3,236,294 A | * | 2/1966 | Thomason | F24F 5/0046 165/48.2 |
| 3,254,702 A | * | 6/1966 | Thomason | F24D 11/007 126/620 |
| 3,254,703 A | * | 6/1966 | Thomason | F24F 5/0046 165/48.2 |
| 3,812,903 A | * | 5/1974 | Thomason | F24F 5/0046 165/236 |
| 3,980,130 A | * | 9/1976 | Thomason | F24D 11/00 165/48.2 |
| 3,983,929 A | * | 10/1976 | Thomason | F24D 11/00 165/48.2 |
| 4,037,583 A | * | 7/1977 | Bakun | F28D 20/0056 126/620 |
| 4,081,024 A | * | 3/1978 | Rush | F24D 11/007 165/62 |

(Continued)

*Primary Examiner* — Kenneth Rinehart
*Assistant Examiner* — Deepak A Deean
(74) *Attorney, Agent, or Firm* — Rosenberg, Klein & Lee

(57) ABSTRACT

A heat storage device is revealed. The heat storage device mainly includes a heat storage tank and a heat conduction unit. A part of the heat conduction unit is arranged in a receiving space of the heat storage tank that is filled with heat storage material. The heat storage material can be material or waste easily gotten from local sources for saving transportation and manufacturing costs. The heat storage material over both the heat conductor and the heat exchanger is heated by conduction. Thus heavy metals and hazardous chemicals in the heat storage material are evaporated and separated from the heat storage material and then are cooled down and collected in solid/liquid form in a condensing unit. The residual air is flowing back of the heat storage tank along pipelines. Thereby the heat storage material is cleaned up, the waste material can be recycled and environmental pollution is reduced.

11 Claims, 3 Drawing Sheets

(56) References Cited

U.S. PATENT DOCUMENTS

| | | | | |
|---|---|---|---|---|
| 4,102,327 | A | * | 7/1978 | Thomason .......... F24D 11/0264 126/615 |
| 4,158,358 | A | * | 6/1979 | Thomason ............ F24F 5/0046 126/400 |
| 4,159,711 | A | * | 7/1979 | Johnson .................. F24S 10/60 126/570 |
| 4,173,304 | A | * | 11/1979 | Johnson ................ F24D 11/007 126/620 |
| 4,233,961 | A | * | 11/1980 | Kelly ...................... F24S 23/77 126/619 |
| 4,265,219 | A | * | 5/1981 | Thomason ............ F24F 5/0046 126/591 |
| 4,289,116 | A | * | 9/1981 | Williams ................ F24S 10/60 126/633 |
| 5,271,237 | A | * | 12/1993 | Popelka .................. F24F 13/22 137/112 |
| 2009/0039089 | A1 | * | 2/2009 | Tsukahara ........... F28D 20/0034 220/592.27 |
| 2012/0285442 | A1 | * | 11/2012 | Hung ................ F28D 20/0056 126/620 |
| 2016/0102910 | A1 | * | 4/2016 | Chen .................. F28D 21/0014 34/93 |

\* cited by examiner

HEAT STORAGE DEVICE

CROSS REFERENCE TO RELATED APPLICATION

This application is a continuation-in-part of application Ser. No. 13/107,152, filed on May 13, 2011, currently pending, the subject matter of which is incorporated herein by reference.

BACKGROUND OF THE INVENTION

1. Field of the Invention

The present invention relates to a heat storage device, especially to a heat storage device in which heat storage material and a heat storage tank are made from local waste so as to reduce transportation and manufacturing costs. Meanwhile, hazardous substances contained in the heat storage material are also removed when a heat source is provided. Thereby the used material can be recycled and environmental pollution is reduced.

2. Description of Related Art

The heating pattern of heaters that heats objects uses electricity as a main energy source. The electric power is converted to electromagnetic waves or heat energy so as to heat objects.

Due to global oil shortage and soaring fuel prices, countries all of the world are trying to develop alternative energy sources such as water, wind, fire, nuclear energy, solar energy, etc. Fire Power plants and nuclear power facilities produce negative effects on the population, environment and the overall ecology. As to the water power, both a dam construction and a large amount of water are required. During the dry season, less or even no power is produced. Geographical limits play an important role in the development of wind power. Wind power generation is a challenge because that an open area with strong wind is required and wind is an unstable power source. As to solar energy, it is renewable, non-polluting and without geographical limits Thus the solar energy is the most popular alternative energy source and much attention is currently focused on its applications.

Generally, electricity is generated by burning fuel. The electricity can produce heat and then the heat is transferred to heat some objects. Now the petrol price is increasing dramatically so that the cost of electricity is also expected to continue rising. This imposes a burden on users. Once the solar heat can be converted into heat efficiently, the consumption of the electricity can be reduced. Moreover, the energy-saving and carbon dioxide emission reduction can also be achieved. Thus various types of solar heating systems are available now. However, the cost of these solar heating systems is quite expensive. While being installed, materials and components required need to be transported to the location the user selects. If the location is in a foreign place or country, the transportation cost is even higher. This places a heavy burden on business or consumers.

Thus there is great room for improvement and a novel heat storage device is required.

SUMMARY OF THE INVENTION

Therefore it is a primary object of the present invention to provide a heat storage device whose components are made of waste or material from local sources so as to reduce transportation and manufacturing costs. In the meantime, hazardous substances contained in the heat storage material are also removed while a heat source is provided. Thereby the used material can be recycled.

In order to achieve the above object, a heat storage device of the present invention mainly includes a heat storage tank, a heat conduction unit, and a condensing unit. A part of the heat conduction unit is disposed in a receiving space of the heat storage tank. The receiving space of the heat storage tank is filled with heat storage material. One side of the condensing unit is connected to a first end of a first pipeline while a second end of the first pipeline is connected to the heat storage tank and communicating with the receiving space of the heat storage tank. A first end of a second pipeline is connected to the other side of the condensing unit while a second end of the second pipeline is connected to a first end of a third pipeline. A second end of the third pipeline is connected to the heat storage tank and communicating with the receiving space of the heat storage tank.

A wall of the heat storage tank includes an inner wall and an outer wall so that a sandwich space is formed therebetween. The space is filled with thermal insulation material.

The thermal insulation material can be calcium silicate, calcium oxide, waste construction materials with thermal insulation property or their combinations.

The heat conduction unit includes a heat conductor and a heat exchanger. A part of the heat conductor and a part of the heat exchanger are mounted in the receiving space and contacted with each other. A part of the heat conductor extending out of the heat storage tank is connected to a heat source while a part of the heat exchanger extending out of the heat storage tank forms a heat supply segment which is connected to an object to be heated.

The heat conductor and the heat exchanger are tubes, each of which is filled a fluid therein.

The heat source is a light gathering cup including a concave surface and an upward opening A connection part is arranged under a light gathering point on a center of the light gathering cup. The connection part is connected to the heat conductor.

The heat storage material can be a physical object whose diameter is less than 30 centimeters.

The heat storage tank can be a vacant container.

The heat storage material can be sand and crushed stone, brick clay, cement, cinder, heavy metal sludge, organic sludge, shell, or their combinations.

The second end of the first pipeline is connected to an upper part of the heat storage tank while the second end of the third pipeline is connected to a lower part of the heat storage tank.

The heat storage device further includes a ventilation unit arranged between the second pipeline and the third pipeline. The second end of the second pipeline is connected to an air inlet of the ventilation unit while the first end of the third pipeline is connected to an air outlet of the ventilation unit.

The heat storage device further includes a power supply unit that is coupled to the ventilation unit.

The power supply unit is a solar cell.

A plurality of heat dissipation fins is formed on the condensing unit.

The condensing unit is further connected to at least one ventilation fan.

A funnel-shaped collecting part is formed on the condensing unit and a discharge outlet is formed on the rear end of the funnel-shaped collecting part. An on-off valve is arranged at the discharge outlet.

The ventilation unit can be a blower.

Thereby the heat storage material is material or waste easily gotten from local sources. The heat storage tank can be a vacant container so as to save transportation and manufacturing costs. Moreover, solar energy is used as a heat source for heating objects so as to replace the heating pattern available now that converts electricity to heat energy for heating objects. The economic burden caused by rising cost of electricity is reduced. The energy saving and carbon dioxide emission reduction can also be achieved. Furthermore, heavy metals and hazardous chemicals in the heat storage material are evaporated and separated owing to thermal desorption when the heat storage material over both the heat conductor and the heat exchanger is heated by conduction. Then the heavy metals and hazardous chemicals are delivered to the condensing unit through pipelines to be cooled down and collected in the solid and/or liquid form. The residual air is turned back to the heat storage tank along pipelines. The heat storage material is cleaned up effectively by the closed cycle system so that the heat storage material can be recycled once the heat storage device is abandoned. The impact of the heat storage material on the environment is minimized.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
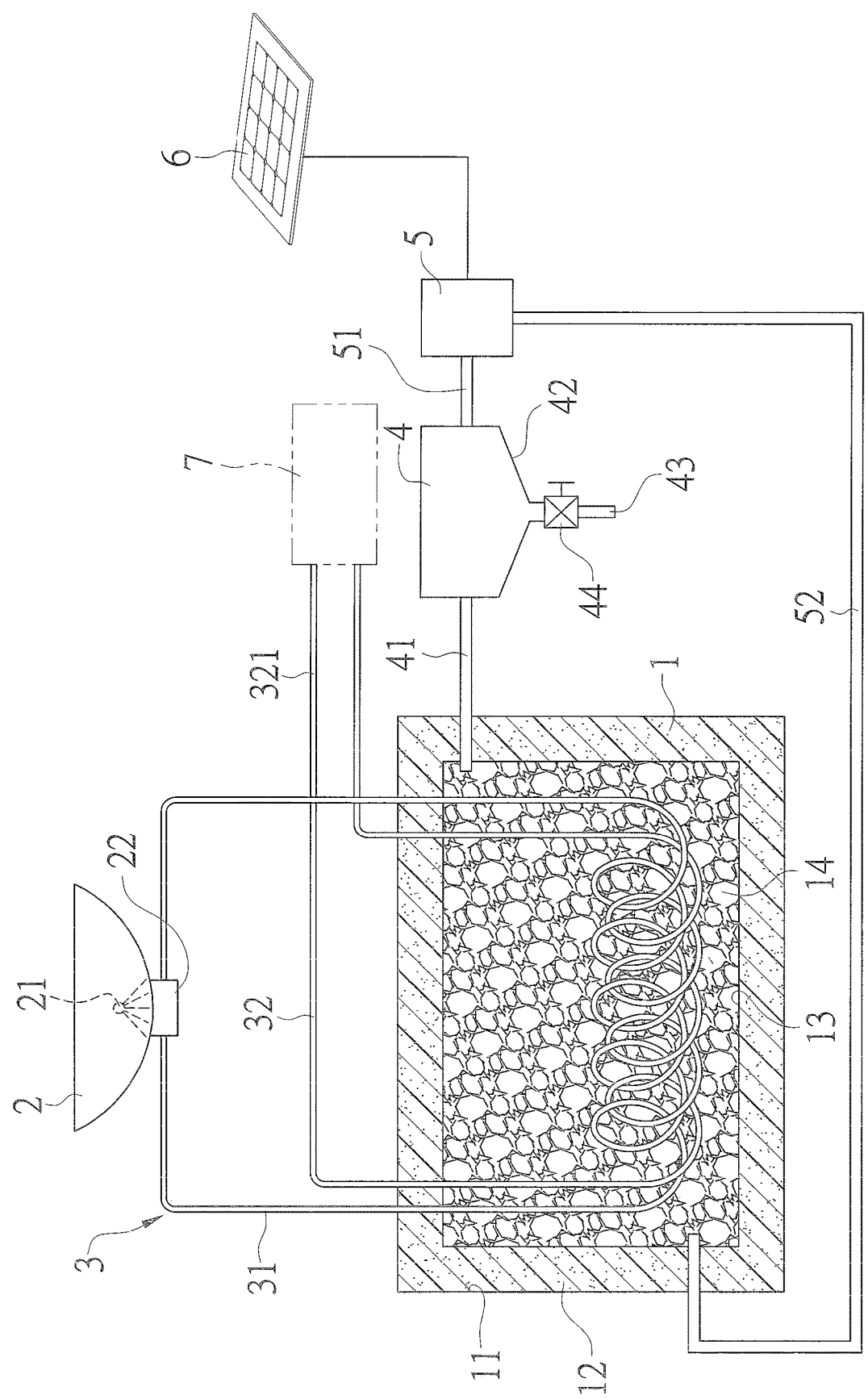
FIG. 1 is a schematic drawing showing structure of an embodiment according to the present invention.

Refer to FIG. 1 a heat storage device of the present invention includes a heat storage tank 1, a heat source 2, a heat conduction unit 3, a condensing unit 4, a ventilation unit 5 and a power supply unit 6.

The heat storage tank 1 can be a container or other device that is easily to get. The wall of the heat storage tank 1 includes an outer wall and an inner wall while a sandwich space 11 is formed between the inner wall and the outer wall. The space 11 is filled with heat insulation material 12. The heat insulation material 12 can be one of the following: calcium silicate board, calcium oxide or construction waste with heat insulation property, or their combinations. The heat storage tank 1 further includes a receiving space 13 for mounting heat storage material 14. The heat storage material 14 is selected from one of the following: sand and crushed stone, including land sand and sea sand, whose diameter is less than 30 centimeters, brick clay, cement, cinder, heavy metal sludge, organic sludge, shell or their combinations. Except the space occupied by a heat conductor 31 and a heat exchanger 32, the heat storage material 14 is filled in the residual space of the receiving space 13 so as to cover both the heat conductor 31 and the heat exchanger 32 well.

The heat source 2 is a light gathering cup including a concave surface and an upward opening A connection part 22 is arranged under a light gathering point 21 on a center of the light gathering cup.

The heat conduction unit 3 includes the heat conductor 31 and the heat exchanger 32, both are tubes with high temperature resistance, high pressure resistance and corrosion resistance. Each tube is filled with a fluid. Moreover, the heat conductor 31 is connected to the connection part 22 of the heat source 2. Furthermore, a part of the heat conductor 31 is extending into the receiving space 13 of the heat storage tank 1 so that the part of the heat conductor 31 and a part of the heat exchanger 32 in the receiving space 13 are contacted with and twisted around each other. Another part of the heat exchanger 32 extending out of the heat storage tank 1 forms a heat supply segment 321 which is connected to an object to be heated 7.

The condensing unit 4 is a condenser that works at normal temperature. A plurality of heat dissipation fins is formed on the condensing unit 4 and used for condensation. Heat is dissipated by the heat dissipation fins. The condensing unit 4 is further connected to at least one ventilation fan that is driven by natural wind force so as to increase the thermal efficiency. One side of the condensing unit 4 is connected to a first end of a first pipeline 41 while a second end of the first pipeline 41 is connected to the heat storage tank 1 and communicating with the receiving space 13 of the heat storage tank 1. A funnel-shaped collecting part 42 is formed on a bottom side of the condensing unit 4. A rear end of the funnel-shaped collecting part 42 is tapered to form a discharge outlet 43. An on-off valve 44 is arranged at the discharge outlet 43.

The ventilation unit 5 is a blower. An air inlet of the ventilation unit 5 is connected to a second end of a second pipeline 51 while a first end of the second pipeline 51 is connected to the other side of the condensing unit 4. An air outlet of the ventilation unit 5 is connected to a first end of a third pipeline 52 while a second end of the third pipeline 52 is connected to and communicating with the receiving space 13 of the heat storage tank 1.

The power supply unit 6 is a solar cell and is coupled to the ventilation unit 5.

Figure 2:
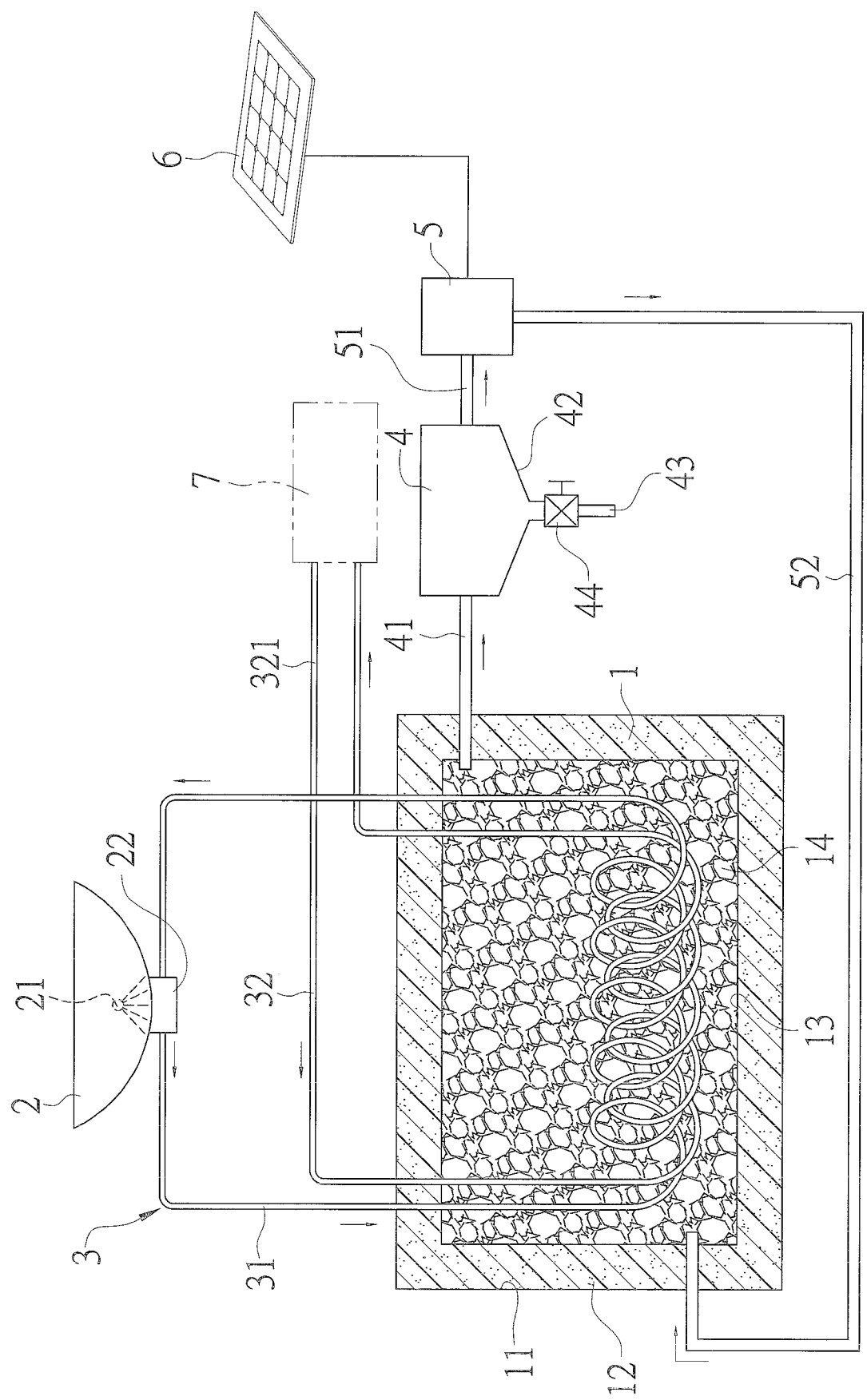
FIG. 2 is a schematic drawing showing an embodiment in use according to the present invention.

In use, as shown in FIG. 2, the heat source 2 is arranged at outdoors where sunlight shines. The sunlight is reflected by the curved surface of the heat source 2 and is focused on the central light gathering point 21 of the heat source 2. Then the focused solar energy is transmitted to the heat conductor 31 through the connection part 22 of the heat source 2 connected to the heat conductor 31 so as to heat the fluid inside the heat conductor 31. Next the heated fluid inside the heat conductor 31 moves therealong and flows into the heat storage tank 1 so that heat exchange occurs between the fluid in the heat conductor 31 and a fluid in the heat exchanger 32 twisted around each other. After receiving heat from the fluid in the heat conductor 31, the temperature of the fluid inside the heat exchanger 32 is increased. Thus the fluid inside the heat exchanger 32 is flowing therealong into the heat supply segment 321 that is in connected to the object to be heated 7. Finally, the object 7 is heated. Thereby the heat source 2 absorbs solar energy so as to heat the fluid in the heat conductor 31. Then heat exchange occurs between the fluid in the heat conductor 31 and a fluid inside the heat exchanger 32. The temperature of the fluid inside the heat exchanger 32 is increased to heat the object 7. During these recycling processes, there is no electricity used. Therefore the heavy burden caused by high-cost electricity for heating the object 7 is reduced, the energy is saved and the carbon dioxide emission is down.

In addition, the receiving space 13 of the heat storage tank 1 is filled by the heat storage material 14. And the heat conductor 31 and the heat exchanger 32 are covered by the storage material 14. Thus the heat is concentrated. Moreover, the heat insulation material 12 between the walls of the heat storage tank 1 provides a great reduction of heat transfer through conduction so as to maintain the receiving space 13 of the heat storage tank 1 in a high-temperature state. Due to the coverage of the storage material 14 and reduction of heat transfer by the heat insulation material 12, the heat is transferred from the fluid inside the heat conductor 31 to the fluid in the heat exchanger 32. The heat storage tank 1 can be a vacant container. By using material from local sources, the heat storage material 14 can be local sand and crushed stone, construction material such as brick clay, cement, etc, or waste such as cinder, shell, heavy metal sludge, organic sludge, etc. Thus the manufacturing cost of the heat storage device is reduced. Moreover, both the construction material and the waste are used again efficiently. The recycling of the material reduces pollutants and protects the environment.

The heat source 2 absorbs solar energy for heating the fluid inside the heat conductor 31. As a solar cell, the power supply unit 6 also receives solar light and provides electricity to the ventilation unit 5 after photovoltaic conversion for driving the ventilation unit 5 to work and generating a negative pressure in the ventilation unit 5. At the moment, air in the receiving space 13 of the heat storage tank 1 is drawn to the ventilation unit 5 through the first pipeline 41, the condensing unit 4 and the second pipeline 51.

During heat exchange between the fluid in the heat conductor 31 in the receiving space 13 of the heat storage tank 1 and a fluid in the heat exchanger 32, the heat storage material 14 that covers the heat conductor 31 and the heat exchanger 32 is also heated by conduction. Thus the temperature of the heat storage material 14 in the receiving space 13 of the heat storage tank 1 is increased continuously and maintained at the high level. Now heavy metals in a solid form and in a liquid form, and hazardous chemicals contained in the heat storage material 14 is evaporated into gas and released from the heat storage material 14 safely. The heavy metals in the gas form and the hazardous chemicals in the gas form are drawn to the ventilation unit 5 through the first pipeline 41, the condensing unit 4 and the second pipeline 51. While arriving the condensing unit 4, the high temperature gas from the receiving space 13 of the heat storage tank 1 is cooled down and converted into solid and/or liquid. Then the solid and/or the liquid are precipitated on the bottom of the condensing unit 4 naturally due to gravity. Then the solid and/or liquid of the heavy metals and hazardous chemicals are collected by the funnel-shaped collecting part 42. The solid and/or liquid of the heavy metals and hazardous chemicals precipitated on the bottom of the condensing unit 4 falls through the discharge outlet 43 once the on-off valve 44 is turned on. The heavy metals and hazardous chemicals can be collected conveniently.

The air in which most of heavy metals and hazardous substances has been removed is drawn into the ventilation unit 5 through the second pipeline 51 and then is turned back to the receiving space 13 of the heat storage tank 1 through the third pipeline 52 that is connected to the air outlet of the ventilation unit 5. The design of the closed system prevents air from the receiving space 13 of the heat storage tank 1 to the condensing unit 4 from being released to outside before being condensed to form solid and/or liquid precipitate. Thus the safety of the thermal desorption of the heavy metals and hazardous chemicals is ensured. Moreover, the heat storage material 14 in the receiving space 13 of the heat storage tank 1 is treated by thermal desorption repetitively owing to the closed cycle system. Thus almost all of heavy metals and hazardous chemicals contained in the heat storage material 14 has been removed once the heat storage device is out of order and abandoned after several years. The heat storage material 14 can be recycled safely. The design lets users make the most of the materials, without causing environmental pollution. The high cost of waste disposal and treatment caused by heavy metals and hazardous chemicals can be minimized. The environmental pollution and ecological damage generated during waste disposal and treatment are reduced.

Figure 3:
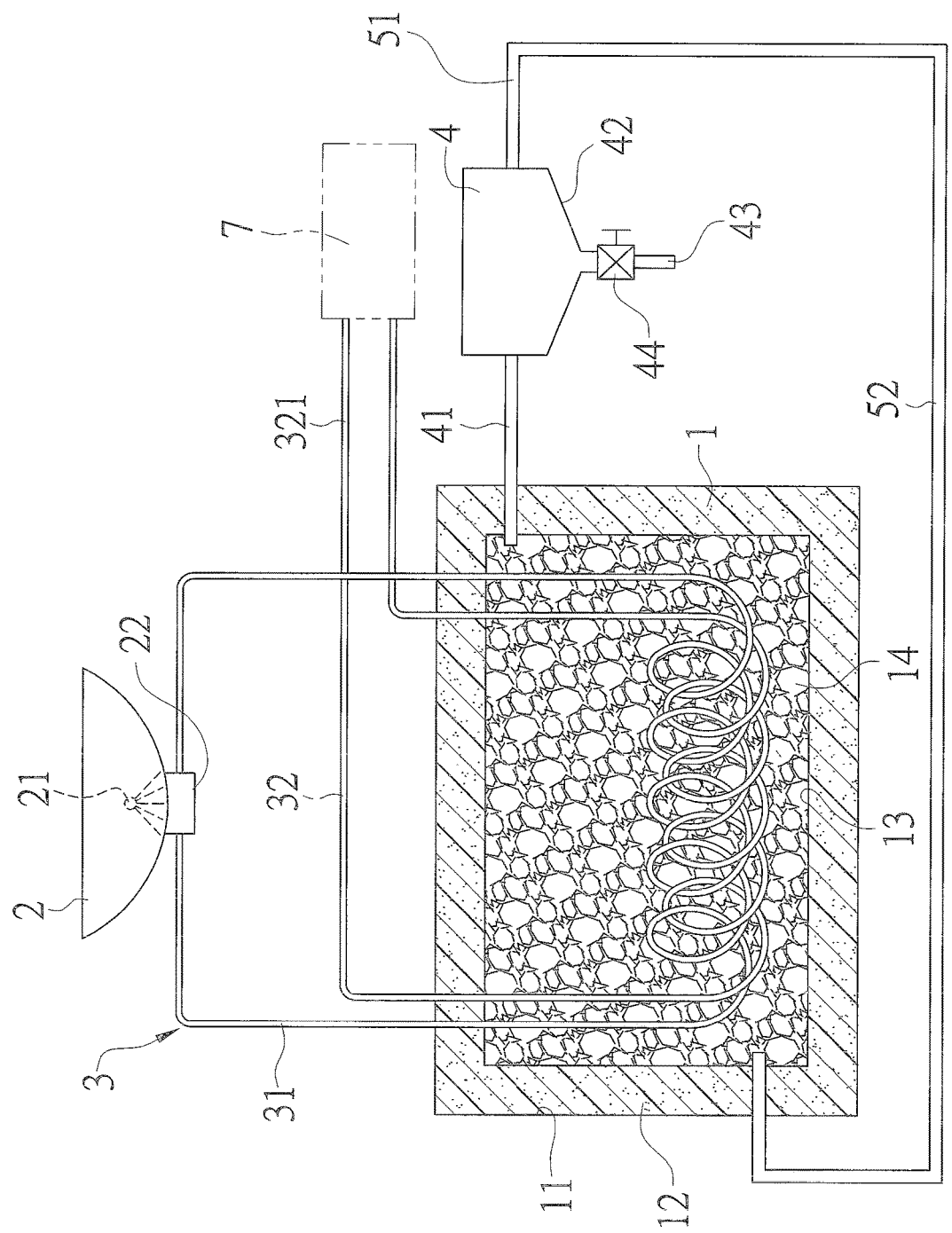
FIG. 3 is a schematic drawing showing structure of another embodiment according to the present invention.

The heat storage material 14 is not limited to the waste material, but also able to be a new or used material easily gotten from local resources and having thermal storage property such as sand and crushed stone, brick clay, cement, cinder, heavy metal sludge, organic sludge, shell, etc. Refer to FIG. 3, another embodiment is revealed. In this embodiment, the ventilation unit 5 and the power supply unit 6 are removed. The first end of the first pipeline 41 is connected to one side of the condensing unit 4 while the second end of the first pipeline 41 is connected to an upper part of the heat storage tank 1. The first end of the second pipeline 51 is connected to the other side of the condensing unit 4 while the second end of the second pipeline 51 is directly connected to the first end of the third pipeline 52. The second end of the third pipeline 52 is connected to a lower part of the heat storage tank 1. The gas including heavy metals and hazardous chemicals can flow in the pipelines owing to natural convection (hot air rises and cold air falls). Without the ventilation unit 5 and the power supply unit 6, the manufacturing cost of the hot storage device according to the present invention is further lowered. In a further embodiment, the second pipeline 51 and the third pipeline 52 can be the same pipeline.

In summary, the present invention has following advantages:

1. The heat storage tank of the heat storage device according to the present invention is a vacant container while the heat storage material is construction material such as sand and crushed stone, brick clay, cement, etc. or waste such as cinder, shell, etc. Thus the waste is recycled or reused again. This not only reduces manufacturing cost of the heat storage device but also makes good use of the material. The pollutants are reduced and the environment is improved.

2. A vacant container from local sources can be used as the heat storage tank of the heat storage device according to the present invention while both the heat storage material and the heat insulation material can be made from waste material generated by construction activities. Thus there is no need to transport the heat storage tank, and material required for the heat storage material and the heat insulation material to the location at which the heat storage device is set up. The transportation cost is saved.

3. The heat storage device of the present invention can store and convert solar energy to heat energy effectively so as to heat objects. Thus the heat storage device can replace the heating pattern used now which heats objects by energy coming from electricity. This helps ease the burden caused by the expensive electricity, saves energy, reduces carbon dioxide emission and protects the environment.

4. In the present invention, the heat storage tank that reduces heat transfer well is use as an environment facilitating heat exchange between the heat conductor absorbed solar energy and the object to be heated. Thereby the solar energy is used to heat the object effectively and efficiently.

5. The heavy metals and hazardous chemicals in the heat storage material are evaporated and separated owing to thermal desorption when the heat storage material over both the heat conductor and the heat exchanger is heated by conduction. Then the heavy metals and hazardous chemicals are flowed to the condensing unit to be cooled down and collected in the solid and/or liquid form. The heat storage material is cleaned up while the object is heated. Thus the heat storage material can be recycled without any need for additional processing once the heat storage device is abandoned. The impact of the heat storage material on the environment is minimized.

6. The heat storage device of the present invention uses solar energy to heat the heat storage material for evaporating and separating heavy metals and hazardous chemicals from the heat storage material. By the ventilation unit being driven by the solar cell, the evaporated heavy metals and hazardous chemicals are drawn into the condensing unit to be cooled down and collected in the solid and/or liquid form. The cost required for treatment of the heavy metals and hazardous chemicals is dramatically reduced. Moreover, the environmental pollution and ecological damage generated during the waste treatment can be avoided.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A heat storage device comprising:
    a heat storage tank having a receiving space having upper and lower ends, the receiving space being filled with at least one heat storage material, the at least one heat storage material containing at least one hazardous substance and at least one other substance evaporating at a higher temperature than the at least one hazardous substance;
    a heat conduction unit in which a part thereof is mounted in the receiving space of the heat storage tank and supplying heat thereto; and
    a condensing unit for removing a vapor of the at least one hazardous substance, the condensing unit having:
        an air inlet pipeline connected between the upper end of the receiving space and the condensing unit for communication of heated air thereto, and
        an air outlet pipeline connected between the condensing unit and the lower end of the receiving space of the heat storage tank to return air thereto,
    wherein airflow between the condensing unit and the receiving space of the heat storage tank through the air inlet pipeline and the air outlet pipeline is by natural convection.

2. The device as claimed in claim 1, wherein a wall of the heat storage tank includes an outer wall and an inner wall while a sandwich space is formed between the inner wall and the outer wall; the sandwich space is disposed with at least one heat insulation material.

3. The device as claimed in claim 2, wherein at least a portion of the heat insulation material includes construction waste materials.

4. The device as claimed in claim 1, wherein the heat conduction unit includes a heat conductor and a heat exchanger; a part of the heat conductor and a part of the heat exchanger are mounted in the receiving space and are in contact with each other; another part of the heat conductor extending out of the heat storage tank is connected to a heat source while another part of the heat exchanger extending out of the heat storage tank forms a heat supply segment; the heat supply segment is connected to an object to be heated.

5. The device as claimed in claim 4, wherein both the heat conductor and the heat exchanger are tubes filled with fluid therein.

6. The device as claimed in claim 4, wherein the heat source is a solar light gathering cup having a concave surface and an upward opening; a light gathering point is formed on a center of the heat source and a connection part is arranged under the light gathering point; the connection part is connected to the heat conductor.

7. The device as claimed in claim 1, wherein the heat storage material is a particulate material, the particulates thereof each having a diameter less than thirty centimeters.

8. The device as claimed in claim 1, wherein the heat storage material is selected from the group consisting of sand and crushed stone, brick clay, cement, cinder, heavy metal sludge, organic sludge, shell, and combinations thereof.

9. The device as claimed in claim 1, wherein the condensing unit further includes a funnel-shaped collecting part and a discharge outlet disposed on a rear end of the funnel-shaped collecting part, the discharge outlet having an on-off valve disposed thereon.

10. The device as claimed in claim 1, wherein the heat storage material is selected from the group consisting of heavy metal sludge and organic sludge.

11. The device as claimed in claim 1, wherein the at least one hazardous substance is a heavy metal.

* * * * *